(12) United States Patent
Dhake et al.

(10) Patent No.: US 11,772,657 B2
(45) Date of Patent: Oct. 3, 2023

(54) METHOD FOR PREVENTING FATIGUE OF A DRIVER OF A MOTOR VEHICLE

(71) Applicant: Ford Global Technologies, LLC, Dearborn, MI (US)

(72) Inventors: Abhinav Dhake, Aachen (DE); Carsten Starke, Zuid Limburg (NL); Stefan Wolter, Würselen (DE); Julius Maximilian Engelke, Aachen (DE); Florian Golm, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/810,502

(22) Filed: Jul. 1, 2022

(65) Prior Publication Data
US 2023/0001931 A1    Jan. 5, 2023

(30) Foreign Application Priority Data
Jul. 5, 2021 (DE) .................... 102021117326.4

(51) Int. Cl.
| | |
|---|---|
| *B60W 40/08* | (2012.01) |
| *G02C 11/04* | (2006.01) |
| *B60W 40/02* | (2006.01) |
| *B60Q 3/70* | (2017.01) |

(52) U.S. Cl.
CPC ............ *B60W 40/08* (2013.01); *B60Q 3/70* (2017.02); *B60W 40/02* (2013.01); *G02C 11/04* (2013.01); *B60W 2040/0827* (2013.01); *B60W 2540/229* (2020.02)

(58) Field of Classification Search
CPC ............... B60W 40/08; B60W 40/02; B60W 2040/0827; B60W 2540/229; B60Q 3/70; G02C 11/04
See application file for complete search history.

(56) References Cited

U.S. PATENT DOCUMENTS

| 10,173,529 | B2* | 1/2019 | Korthauer | B60R 1/00 |
| 2012/0224060 | A1* | 9/2012 | Gurevich | G06V 20/58 |
| | | | | 348/148 |
| 2015/0182759 | A1* | 7/2015 | Baek | G02B 5/1814 |
| | | | | 359/566 |
| 2021/0269045 | A1* | 9/2021 | Katz | G06V 20/56 |
| 2022/0114816 | A1* | 4/2022 | Nilsson | G06V 20/59 |

* cited by examiner

*Primary Examiner* — Mohamed Barakat
(74) *Attorney, Agent, or Firm* — Brandon Hicks; Eversheds Sutherland (US) LLP

(57) ABSTRACT

The invention relates to a method for preventing fatigue of a driver of a motor vehicle (4), with the steps of: acquiring position data (PDM0) indicative of the position of the driver, and activating and/or deactivating light glasses (10) worn by the driver depending on an evaluation of the acquired position data (PDM) indicative of the position of the driver.

18 Claims, 2 Drawing Sheets

METHOD FOR PREVENTING FATIGUE OF A DRIVER OF A MOTOR VEHICLE

CROSS-REFERENCE TO RELATED APPLICATIONS

This application claims priority to and the benefit of German Application No. DE 102021117326.4, filed Jul. 5, 2021, which is hereby incorporated by reference herein in its entirety.

FIELD

The invention relates to a method for preventing fatigue of a driver of a motor vehicle.

BACKGROUND

Drivers of motor vehicles such as delivery vehicles of delivery services who begin to work early in the morning and/or work in shifts suffer fatigue symptoms due to a shortage of daylight. It is known that a light therapy using light with a high proportion of blue can effectively counteract this kind of fatigue symptom.

Light glasses are known from both WO 2017/176115 A1 and WO 2019/070119 A1 that should counteract fatigue in the wearer of the light glasses through the output of light.

The use of such light glasses in motor vehicles in order to counteract the driver fatigue is known from each of BE 1018173 A3, US 2015/0182759 A1 and US 2016/0187673 A1.

Ambient lighting that can also be employed in motor vehicles and with which driver fatigue can be counteracted is known from each of DE 102 32 797 A1, DE 10 2005 052 777 A1, DE 10 2016 203 164 A1 and US 2005/0207174 A1.

Data glasses with which the tiredness of the wearer of the data glasses can also be acquired are known from DE 10 2014 206 626 A1 and US 2016/0314674 A1.

There is a need to indicate further ways in which fatigue of a driver of a motor vehicle can be effectively counteracted.

SUMMARY

The object of the invention is achieved through a method for preventing the fatigue of a driver of a motor vehicle, having the steps of: acquiring position data indicative of the position of the driver, and activating and/or deactivating light glasses worn by the driver depending on an evaluation of the acquired position data indicative of the position of the driver.

The tiredness of a driver is thus, for example, only counteracted by activating the light glasses when the driver is at specific positions such as, for example, a distribution center of a delivery service where, at the beginning of his delivery round, the driver loads the goods that are to be delivered into his motor vehicle configured as a delivery vehicle. For example, at such a location, driver fatigue can particularly effectively be counteracted at the beginning of a shift without road safety being impaired by wearing active light glasses.

According to one embodiment, the light glasses are activated when the position data are indicative of a current position of the driver outside the motor vehicle, and the light glasses are deactivated when the position data are indicative of a current position of the driver inside the motor vehicle. In other words, when the position data are indicative of a current position of the driver inside the motor vehicle, it is concluded from this that the driver is moving the motor vehicle. It is ensured through the deactivation of the light glasses that the road safety is not impaired by wearing active light glasses. Conversely, when the driver is located outside the motor vehicle, it is assumed that the driver is not moving the motor vehicle. The tiredness of the driver can now be counteracted by activating the light glasses without impairing road safety.

According to a further embodiment, an ambient lighting of the motor vehicle is activated if the position data are indicative of a current position of the driver inside the motor vehicle. In other words, if the driver is located in the motor vehicle, the ambient lighting of the motor vehicle is used instead of the light glasses to counteract the driver fatigue. The tiredness of the driver can thus be counteracted even while driving without activating the light glasses. In this way, for example, operating energy stores of the light glasses such as batteries can be conserved, and the operating time of the light glasses thereby increased.

According to a further embodiment, the further steps of acquiring a value indicative of a daylight intensity, and deactivating the light glasses worn by the driver if the value indicative of a daylight intensity exceeds a predefined threshold value are carried out. It is, in other words, assumed that the tiredness of the driver reduces with increasing daylight, and that therefore there is no longer a need to counteract the tiredness of the driver. Unnecessary operation of, in particular, the light glasses is thus avoided. This also preserves the operating energy store of the light glasses, and thereby again increases the operating time of the light glasses.

According to a further embodiment, the further steps of acquiring position data indicative of the position of the motor vehicle, and activating and/or deactivating the light glasses worn by the driver depending on an evaluation of the acquired position data indicative of the position of the motor vehicle are carried out.

On the basis of the position data indicative of the position of the motor vehicle, it is possible to detect that the motor vehicle is currently located at a delivery location for a delivery, and that the driver therefore will leave the motor vehicle in order to perform the delivery of the goods. In other words, the position data indicative of the position of the motor vehicle are evaluated in order to prepare a prediction as to when an activation of the light glasses is useful.

According to a further embodiment, the further steps of acquiring operating and/or state data of the motor vehicle, and activating and/or deactivating the light glasses worn by the driver depending on an evaluation of the acquired operating and/or state data of the motor vehicle are carried out.

The operating and/or state data of the motor vehicle can, for example, be indicative of an occupied driver's seat, an opened or closed driver's door, or the motor being stationary during an intermediate halt. A prediction of when an activation of the light glasses will be useful can thus also be prepared without position data, in particular if these are not present or not available.

A computer program product designed to carry out such a method, a system for fatigue prevention of a driver of a motor vehicle, and a motor vehicle with a system of this type, also belong to the invention.

BRIEF DESCRIPTION OF THE DRAWINGS

The invention will now be explained with reference to a drawing, In the figures.

DETAILED DESCRIPTION

Figure 1:
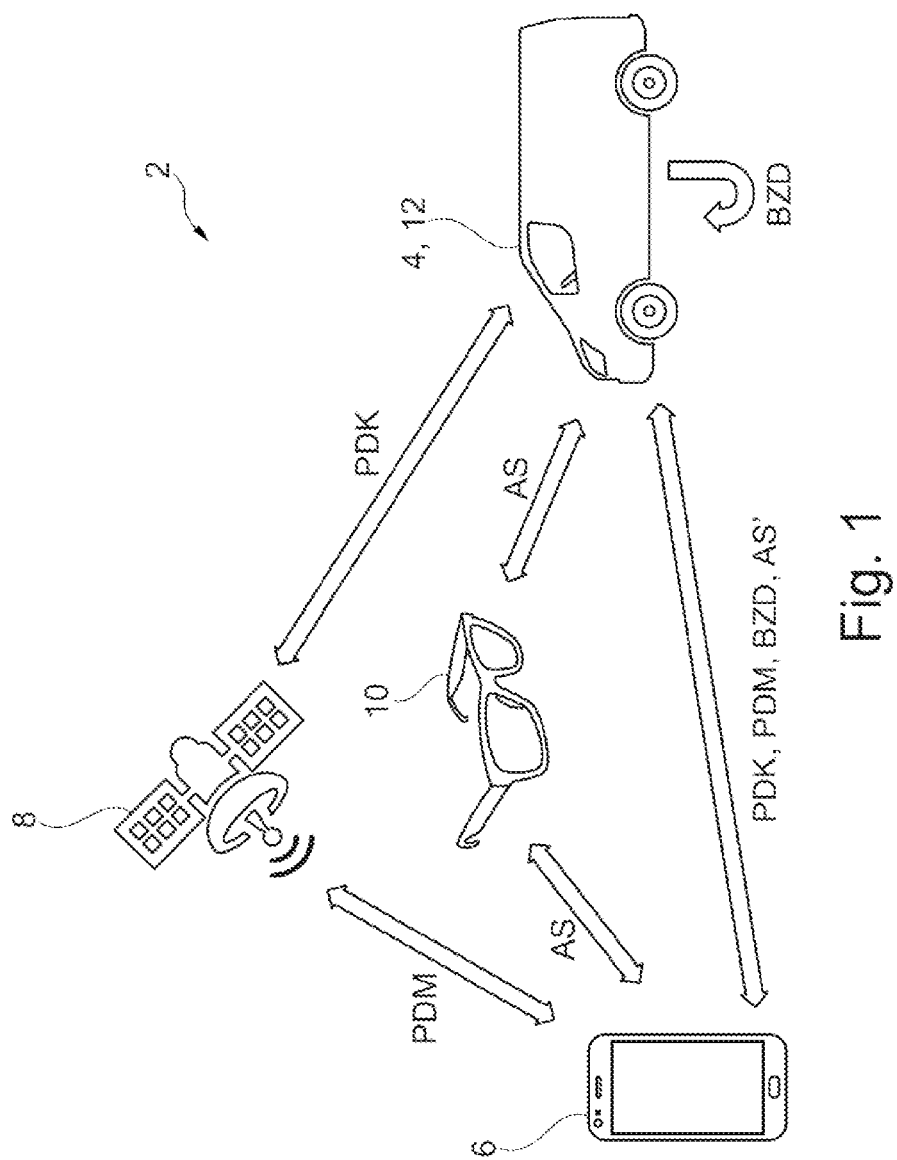
FIG. 1 shows a schematic illustration of components of a system for preventing fatigue of a driver of a motor vehicle.

Reference is first made to FIG. 1.

Components of a system 2 for preventing fatigue of a driver of a motor vehicle 4 are illustrated.

In addition to the motor vehicle 4, the components of the system 2 are a mobile device 6 and light glasses 10 of the driver.

In the present exemplary embodiment, the motor vehicle 4 is designed as a delivery vehicle of a delivery service for the delivery of goods shipments. The motor vehicle 4 in the present exemplary embodiment further comprises an ambient lighting 12 with which, using appropriate lighting, driver fatigue can be counteracted with light having a high proportion of blue.

The motor vehicle 4 is, furthermore, in the present exemplary embodiment designed to read position data PDK that are indicative of the position of the motor vehicle 2 of a global navigation satellite system 8. Such a global navigation satellite system 8 (also known as GNSS) refers here to a system for position determination and navigation on the ground and in the air through the reception of signals from navigation satellites. In the present exemplary embodiment, the global navigation satellite system 8 is a GPS system.

The motor vehicle 4 in the present exemplary embodiment is furthermore designed to acquire operating and/or state data BZD of the motor vehicle 4. The operating and/or state data BZD of the motor vehicle 4 can, for example, be indicative of an occupied driver's seat, an opened or closed driver's door, or the motor being stationary during an intermediate halt.

The mobile device 6 is a terminal device that can, as a result of its size and its weight, be carried along with the driver without great physical effort and can thereby be employed in a mobile manner. In the present exemplary embodiment it is a smartphone. Other than in the present exemplary embodiment, it can also, however, for example, be a tablet computer or a notebook.

The mobile device 6 is, furthermore, in the present exemplary embodiment designed to read position data PDM that are indicative of the position of the driver or of the mobile device 6 of a global navigation satellite system 8. The mobile device 6 in the present exemplary embodiment is furthermore designed for wireless data exchange, for example by means of Bluetooth, with the motor vehicle 4 in a Car-to-X context. The position data PDM indicative of the position of the driver and/or the position data PDK indicative of the position of the motor vehicle 4 can thus, for example, be exchanged. A control signal AS' for activating the ambient lighting 12 can, furthermore, be transmitted from the mobile device 6 to the motor vehicle 4. The operating and/or state data BZD can, furthermore, be transmitted from the motor vehicle 4 to the mobile device 6, in particular when the mobile device 6 comprises software components designed as a computer program product that are designed for the evaluation of the position data PDM indicative of the position of the driver and/or for the evaluation of the position data PDK indicative of the position of the motor vehicle 4, and/or for the evaluation of the operating and/or state data BZD in order to determine the control signal AS for activating the light glasses 10 and/or the further control signal AS' for activating the ambient lighting 12. Other than in the present exemplary embodiment, other components of the system 2 can also comprise software components designed as computer program product that are designed for the evaluation of the position data PDM indicative of the position of the driver and/or the position data PDK indicative of the position of the motor vehicle 4, and/or the operating and/or state data BZD in order to determine the control signal AS for activating the light glasses 10 and/or the further control signal AS' for activating the ambient lighting 12.

The light glasses 10 are designed to counteract the driver fatigue through the output of light with a high portion of blue. The light glasses 10 of the present exemplary embodiment are furthermore designed for wireless data exchange, for example by means of Bluetooth, with the mobile device 6 and the motor vehicle 4 in a Car-to-X context. Control signals AS for activating and deactivating the light glasses 10 can thus be transmitted to them.

To effectively counteract driver fatigue of the motor vehicle 4, the system 2 is designed to acquire the position data PDM indicative of the position of the driver, and at least to activate and/or deactivate the light glasses 10 depending on an evaluation of the acquired position data PDM indicative of the position of the driver using the corresponding control signal AS.

For this purpose, and for the tasks and functions described below, the system 2, in particular the motor vehicle 4, the mobile device 6 and the light glasses 10, can comprise appropriate hardware and/or software components.

The light glasses 10 are activated here by the control signal AS when the position data PDM are indicative of a current position of the driver outside the motor vehicle 4. The light glasses 10 are in contrast deactivated when the position data PDM are indicative of a current position of the driver inside the motor vehicle 4. This is, for example, the case when the position data PDM indicative of a current position of the driver are identical with the position data PDK indicative of the position of the motor vehicle 4.

The system 2 is furthermore designed to activate the ambient lighting 12 of the motor vehicle 4 using the further control signal AS' when the position data PDM are indicative of a current position of the driver inside the motor vehicle 4.

The system 2 is also designed to acquire a value indicative of a daylight intensity and to deactivate the light glasses 10 worn by the driver when the value W indicative of a daylight intensity (see FIG. 2) exceeds a predetermined threshold value (see FIG. 2 again).

The determination of the value W indicative of a daylight intensity can be made directly by measuring with a daylight sensor of the motor vehicle 4. Alternatively or in addition, the value W indicative of a daylight intensity can also be determined indirectly by evaluating a clock and/or weather data.

The system 2 is thus designed to activate and/or deactivate the light glasses 10 worn by the driver through the appropriate control signal AS, depending on the evaluation at least of the acquired position data PDK indicative of the position of the motor vehicle 4.

In the present exemplary embodiment, the system 2 is furthermore designed to activate and/or deactivate the light glasses 10 worn by the driver through the appropriate control signal AS, depending on an evaluation of the acquired operating and/or state data BZD of the motor vehicle 4.

Figure 2:
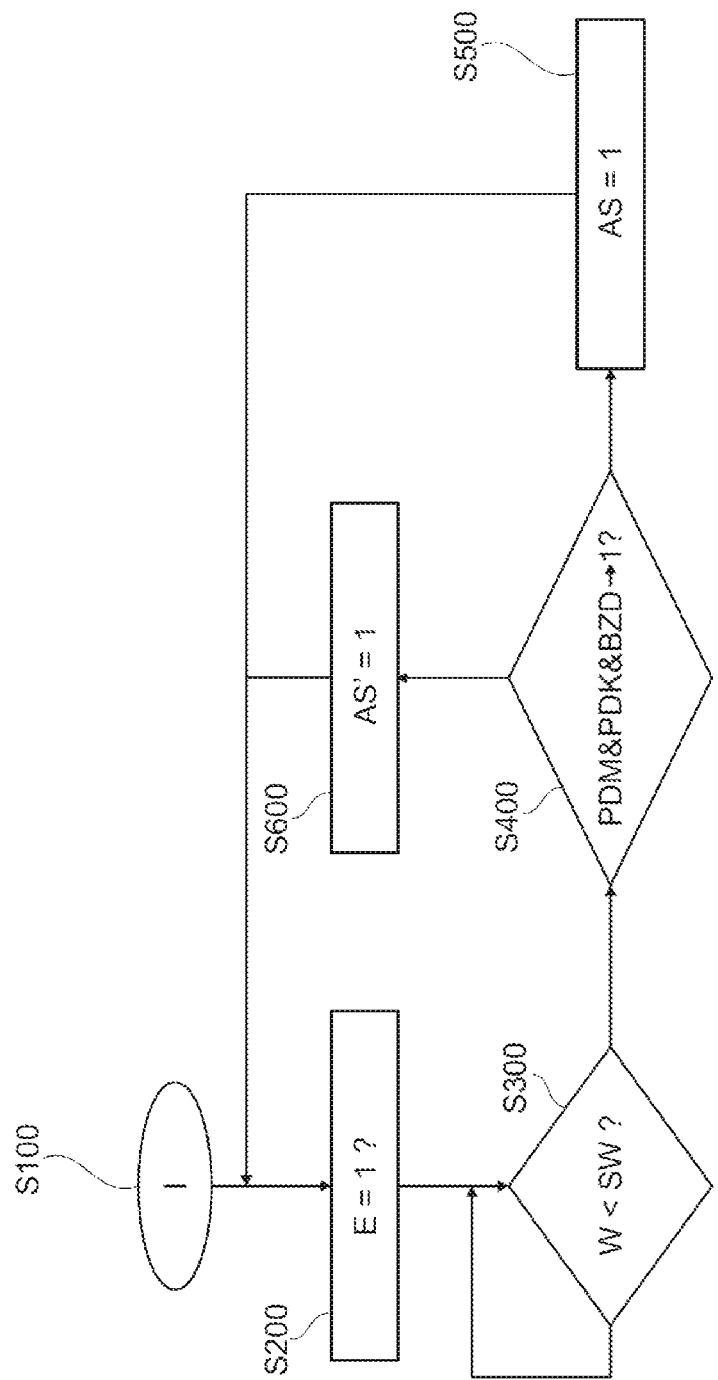
FIG. 2 shows a schematic illustration of a method flow for operation of the system shown in FIG. 1.

A process flow for the operation of the system 2 is now explained with additional reference to FIG. 2.

In a first step S100, the system 2 is started and, for example, runs through an initialization phase I, for example to establish data transmission connections between the said components of the system 2.

In a further step S200, it is established that the driver has begun his activity and is wearing the light glasses 10. He can, for example, confirm this by means of an input E at the mobile device 6.

In a further step S300, a value W indicative of a daylight intensity is acquired, and compared with a predetermined threshold value SW.

If the value W indicative of a daylight intensity exceeds the predetermined threshold value SW, the light glasses 10 worn by the driver are deactivated. Further values W are furthermore compared with the threshold value SW. In other words, an ongoing comparison of the respective latest value W with the predetermined threshold value SW monitors whether the value W exceeds the threshold value SW.

If, on the other hand, the value W indicative of a daylight intensity does not exceed the predetermined threshold value SW, the method is continued with the further step S400.

In the further step S400, a check is made in a first partial step as to whether the position data PDM are indicative of a current position of the driver outside the motor vehicle 2. In at least one second partial step, the position data PDM indicative of a current position of the driver and/or the position data PDK indicative of the position of the motor vehicle 4, and/or the acquired operating and/or state data BZD of the motor vehicle 4 are evaluated to determine whether the motor vehicle 4 is currently located at a delivery location for a delivery, and that the driver therefore will leave the motor vehicle 4 in order to perform the delivery of the goods.

If the evaluation shows that the driver is located outside the motor vehicle 4 and not in the cargo compartment, the method is continued with a further step S500.

In the further step S500, the light glasses 10 are then activated by the control signal AS.

If, on the other hand, the evaluation shows that the driver is either not located outside the motor vehicle 4 or is in the cargo compartment, the method is continued with a further step S600.

In the further step S600, the ambient lighting of the motor vehicle 4 is then activated by the further control signal AS'.

Other than in the present exemplary embodiment, the sequence of the steps or partial steps can also be different. Multiple steps or partial steps can, furthermore, also be carried out at the same time or simultaneously. It is also furthermore possible for individual steps or partial steps to be omitted or skipped.

The tiredness of a driver is thus, for example, only counteracted by activating the light glasses 10 when the driver is at specific positions such as, for example, a distribution center of a delivery service where, at the beginning of his delivery round, the driver loads the goods that are to be delivered into his motor vehicle 4 configured as a delivery vehicle. For example, at such a location, driver fatigue can particularly effectively be counteracted at the beginning of a shift without road safety being impaired by wearing active light glasses 10.

The systems, methods, and processes described herein may be implemented by one or more computers in communication with one another. Each computer may include one or more processors and memory. The computers may comprise controllers or the like for implementing the various functions.

LIST OF REFERENCE SIGNS

2 System
4 Motor vehicle
6 Mobile device
8 Global navigation satellite system
10 Light glasses
12 Ambient lighting
AS Control signal
AS' Control signal
BZD Operating and/or state data
E Input
I Initialization phase
PDM Position data
PDK Position data
SW Threshold value
W Value
S100 Step
S200 Step
S300 Step
S400 Step
S500 Step
S600 Step

The invention claimed is:

1. A method for preventing fatigue of a driver of a motor vehicle (4), the method comprising:
   acquiring position data (PDM) indicative of the position of the driver, and
   activating and/or deactivating light glasses (10) worn by the driver depending on an evaluation of the acquired position data (PDM) indicative of the position of the driver.

2. The method according to claim 1, wherein the light glasses are activated when the position data (PDM) are indicative of a current position of the driver outside the motor vehicle (4), and wherein the light glasses are deactivated when the position data (PDM) are indicative of a current position of the driver inside the vehicle (4).

3. The method according to claim 1, wherein an ambient lighting (12) of the motor vehicle (4) is activated if the position data (PDM) are indicative of a current position of the driver inside the motor vehicle (4).

4. The method according to claim 1, further comprising:
   acquiring a value indicative of a daylight intensity, and
   deactivating the light glasses (10) worn by the driver if the value (W) indicative of a daylight intensity exceeds a predefined threshold value (SW).

5. The method according to claim 1, further comprising:
   acquiring position data (PDK) indicative of the position of the motor vehicle (4), and
   activating and/or deactivating the light glasses (10) worn by the driver depending on an evaluation of the acquired position data (PDK) indicative of the position of the motor vehicle (4).

6. The method according to claim 1, further comprising:
   acquiring operating and/or state data (BZD) of the motor vehicle (4), and
   activating and/or deactivating the light glasses (10) worn by the driver depending on an evaluation of the acquired operating and/or state data (BZD) of the motor vehicle (4).

7. A system (2) for preventing the fatigue of a driver of a motor vehicle (4), the system comprising:
   a processor and memory, wherein the processor is configured to:
   acquire position data (PDM) indicative of the position of the driver, and activate and/or deactivate light glasses (10) worn by the driver depending on an evaluation of the acquired position data (PDM) indicative of the position of the driver.

8. The system (2) according to claim 7, wherein the system (2) is designed to activate the light glasses when the position data (PDM) are indicative of a current position of the driver outside the motor vehicle (4), and to deactivate the light glasses when the position data (PDM) are indicative of a current position of the driver inside the vehicle (4).

9. The system (2) according to claim 7, wherein the system (2) is designed to activate an ambient lighting (12) of the motor vehicle (4) if the position data (PDM) are indicative of a current position of the driver inside the motor vehicle (2).

10. The system (2) according to claim 7, wherein the system (2) is designed to acquire a value (W) indicative of a daylight intensity and to deactivate the light glasses (10) worn by the driver when the value (W) indicative of a daylight intensity exceeds a predetermined threshold value (SW).

11. The system (2) according to claim 7, wherein the system (2) is designed to acquire position data (PDK) indicative of the position of the motor vehicle (4), and to activate and/or deactivate the light glasses (10) worn by the driver depending on an evaluation of the acquired position data (PDK) indicative of the position of the motor vehicle (4).

12. The system (2) according to claim 7, wherein the system (2) is designed to acquire operating and/or state data (BZD) of the motor vehicle (4), and to activate and/or deactivate the light glasses (10) worn by the driver depending on an evaluation of the acquired operating and/or state data (BZD) of the motor vehicle (4).

13. A motor vehicle (4) comprising:
a processor and memory, wherein the processor is configured to:
acquire position data (PDM) indicative of the position of the driver, and
activate and/or deactivate light glasses (10) worn by the driver depending on an evaluation of the acquired position data (PDM) indicative of the position of the driver.

14. The motor vehicle (4) according to claim 13, wherein the processor is configured to activate the light glasses when the position data (PDM) are indicative of a current position of the driver outside the motor vehicle (4), and to deactivate the light glasses when the position data (PDM) are indicative of a current position of the driver inside the vehicle (4).

15. The motor vehicle (4) according to claim 13, wherein the processor is configured to activate an ambient lighting (12) of the motor vehicle (4) if the position data (PDM) are indicative of a current position of the driver inside the motor vehicle (2).

16. The motor vehicle (4) according to claim 13, wherein the processor is configured to acquire a value (W) indicative of a daylight intensity and to deactivate the light glasses (10) worn by the driver when the value (W) indicative of a daylight intensity exceeds a predetermined threshold value (SW).

17. The motor vehicle (4) according to claim 13, wherein the processor is configured to acquire position data (PDK) indicative of the position of the motor vehicle (4), and to activate and/or deactivate the light glasses (10) worn by the driver depending on an evaluation of the acquired position data (PDK) indicative of the position of the motor vehicle (4).

18. The motor vehicle (4) according to claim 13, wherein the processor is configured to acquire operating and/or state data (BZD) of the motor vehicle (4), and to activate and/or deactivate the light glasses (10) worn by the driver depending on an evaluation of the acquired operating and/or state data (BZD) of the motor vehicle (4).

* * * * *